United States Patent [19]
Takahara et al.

[11] Patent Number: 5,759,351
[45] Date of Patent: Jun. 2, 1998

[54] METHOD OF MANUFACTURING A FILTER HAVING LONGITUDINAL CHANNELS BY MOLDING FROM A SLURRY USING THERMOSETTING RESIN

[75] Inventors: Toshihiro Takahara, Kariya; Keizou Funae, Anjo; Jouji Yamaguchi, Kariya; Takeharu Maekawa, Chita-gun, all of Japan

[73] Assignee: Nippondenso Co., Ltd., Kariya, Japan

[21] Appl. No.: 686,646

[22] Filed: Jul. 26, 1996

[30] Foreign Application Priority Data

Jul. 28, 1995 [JP] Japan ............................ 7-193892

[51] Int. Cl.⁶ .................................................. B01D 39/18
[52] U.S. Cl. ...................... 162/218; 210/493.1; 210/509; 162/224
[58] Field of Search .......................... 210/497.01, 497.2, 210/493.1, 493.5, 494.1, 496, 505, 509, 510.1; 162/218, 228, 231, 382, 387, 224

[56] References Cited

U.S. PATENT DOCUMENTS

| | | | |
|---|---|---|---|
| 3,622,446 | 11/1971 | Burnham | 162/218 |
| 4,111,815 | 9/1978 | Walker et al. | 210/509 |
| 4,732,678 | 3/1988 | Humbert, Jr. | 210/493.1 |
| 4,889,630 | 12/1989 | Reinhardt et al. | 210/509 |
| 4,929,308 | 5/1990 | Gerault et al. | 162/218 |
| 5,084,178 | 1/1992 | Miller et al. | 210/493.1 |

FOREIGN PATENT DOCUMENTS

| | | |
|---|---|---|
| 85369 | 7/1976 | Japan. |
| 43709 | 11/1978 | Japan. |
| 142513 | 11/1980 | Japan. |
| 160043 | 6/1990 | Japan. |
| 8964 | 3/1992 | Japan. |
| 122402 | 4/1992 | Japan. |

*Primary Examiner*—W. L. Walker
*Attorney, Agent, or Firm*—Nixon & Vanderhye P.C.

[57] ABSTRACT

A slurry of suspended formation fiber and binder fiber is brought to pass through a suction unit to form a molded member. Longitudinally extending channel portions are formed on both inner and outer peripheral surfaces of the molded member, and a wall portion is formed to close one end of the channel portions of the inner peripheral surface. Further, opposite surfaces of the channel portion at the other end of the molded member are closed by pressing from outside and bonded by binder resin which is impregnated into the molded member.

10 Claims, 16 Drawing Sheets

METHOD OF MANUFACTURING A FILTER HAVING LONGITUDINAL CHANNELS BY MOLDING FROM A SLURRY USING THERMOSETTING RESIN

CROSS-REFERENCE TO RELATED APPLICATION

This application is related to and claims priority from Japanese Patent Application No. Hei. 7-193892, the contents of which are incorporated by reference.

BACKGROUND OF THE INVENTION

1. Field of the Invention

The present invention relates to a filter element for filtering small particles contained in a liquid.

2. Description of Related Art

Conventionally, a filter element formed in cylindrical shape is well known as is disclosed in JP-A 2-160043. However, such a simple cylindrical filter element has a limited filter surface area. To increase the surface area of the filter, a filter element forming a plurality of channel portions on the outer peripheral surface of the cylinder or the inner peripheral surface of the cylinder in the cylindrical direction has been proposed in JP-A 53-43709.

However, when a plurality of channel portions are formed on an inner peripheral surface of the cylinder of the filter element, it is necessary to seal the channel portions in the opposite end surfaces of the filter element. Therefore, a sealing member must be fastened the end surfaces of the filter element with an adhesive material, whereby the manufacturing process is increased and productivity is decreased.

SUMMARY OF THE INVENTION

In view of the foregoing problems of the prior art, it is an object of the present invention to provide a cylindrical filter element having channel portions in the inner peripheral surface without using an extra adhesive material.

According to the present invention, opposite surfaces of the channel portions at one end portion of the filter element are closed and bonded by a binder. That is, the binder of the filter element is used as an adhesive material for closing the channel portion, therefore an extra adhesive material is not necessary.

Further, a separate sealing member for closing the channel portions is not necessary. Thus, the manufacturing process becomes simple and productivity can be improved.

Heat fusible fiber may be added to the slurry with the forming fiber as a binder. After heating the heat fusible fiber, the heated and fused fiber is cooled and stiffened to hold the shape of the forming body.

Further, the opposite surfaces of the channel portions are closed and bonded by heating the heat fusible fiber. Thermosetting resin may be added in slurry or impregnated in the forming body as the binder.

According to the present invention, a sealing member for closing the channel portions may be bonded to the end surface of the filter element in the cylindrical direction.

According to the present invention, one end surface of the molded member is closed when the molded member is formed. Therefore, only the other end of the molded member is closed by the binder.

According to the present invention, two cylindrical molded members are bonded to each other to form a filter element. One end of each of the molded bodies is closed when they are formed, and the other end is bonded to each other by the binder.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Preferred embodiments of the present invention are described hereinafter with reference to the accompanying drawings.

(First Embodiment)

Figure 1:
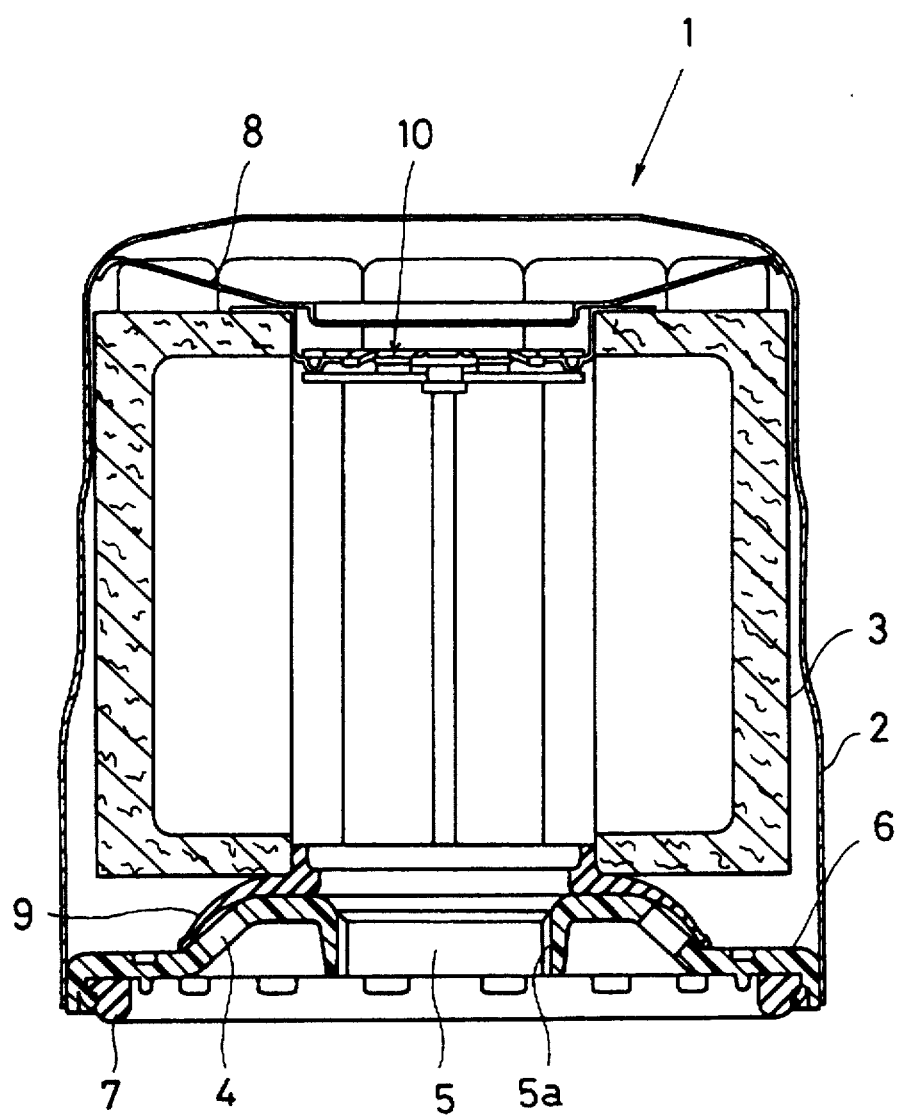
FIG. 1 is a cross-sectional view illustrating an oil filter with a filter element according to a first embodiment of the present invention.

Firstly, the structure of an oil filter 1 will be described with reference to FIG. 1. In FIG. 1, a filter element 3 is held in a cylindrical case 2, a plate 6 having an oil flow inlet 4 and an oil flow outlet 5 is attached to the opening portion of the case 2. The oil filter 1 is installed in an installation base (not shown) of an engine side through a rubber gasket 7 which is held in the plate 6.

One end of the filter element 3 is biased by a plate spring 8, which are located at the upper end of the case 2. The other end of the filter element 3 holds a rubber check valve 9 which is supported by the plate 6. A relief valve 10 is installed at the center of the upper end of the filter element 3. When the filter element 3 becomes clogged up, the pressure in the case 2 (the pressure outside the filter element 3) increases, so that relief valve 10 opens to keep the flow rate of the oil supplied to the engine.

Further, the outlet 5 is located in the center portion of the plate 6, and a plurality of oil flow inlets 4 for the oil discharged from the engine are located around the oil flow outlet 5. A female screw portion 5a is formed on the inner peripheral surface of the oil flow outlet 5 to receive a male screw (not shown) fixed to the installation base of the engine side.

The check valve 9 closes the oil flow inlet 4 from the inside of the plate 6 to prevent oil from discharging from the oil flow inlet 4. The check valve 9 opens only when the oil is discharged from the engine.

Figure 2:
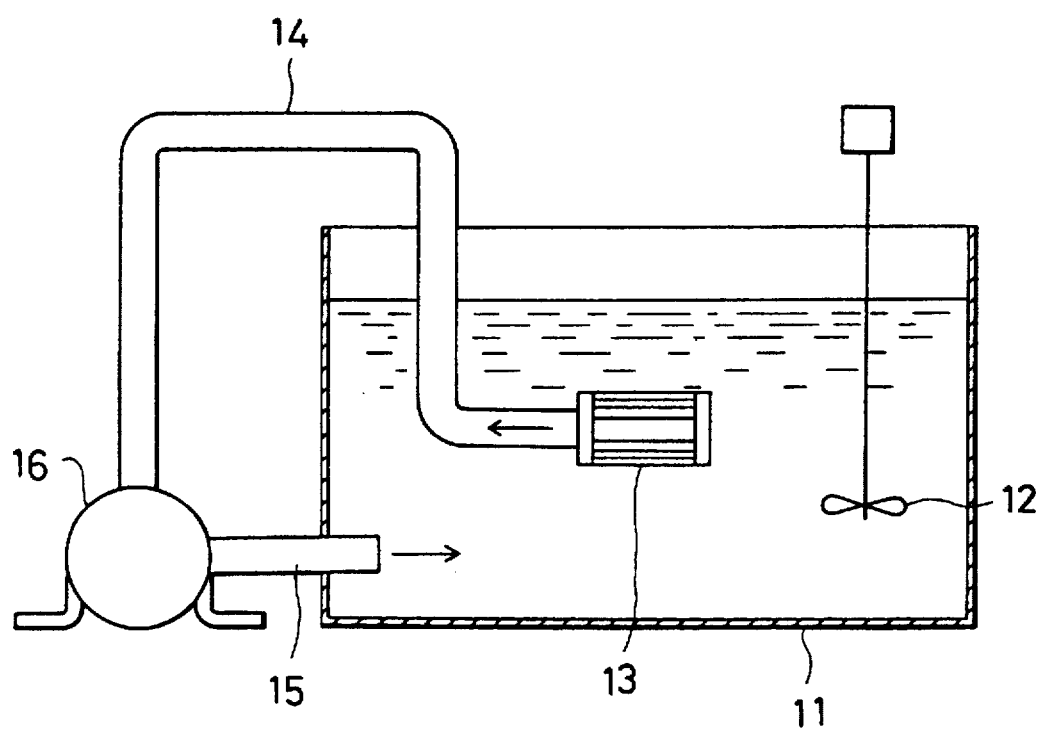
FIG. 2 is a schematic view illustrating a suction-forming system according to the first embodiment.

A molded member 30 of the filter element 3 is formed by a suction-forming system shown in FIG. 2, and then the opposite end surfaces of the molded member 30 (reference to FIG. 5 and FIG. 6) are sealed.

The suction-forming system is composed of a water tank 11 which contains a suitable amount of slurry of suspended fiber, an agitator 12 for agitating the slurry in the water tank 11, a suction jig 13 dipped in the slurry in the water tank 11, a suction pump 16 which takes in the slurry through a suction pipe 14 which is connected with the suction jig 13 and returns the slurry into the water tank 11 through a discharge pipe 15. A fiber component of the molded member 30 is made of low cost natural pulp, however chemical fiber such as polyester, acrylic and rayon may be used.

Figure 3A:
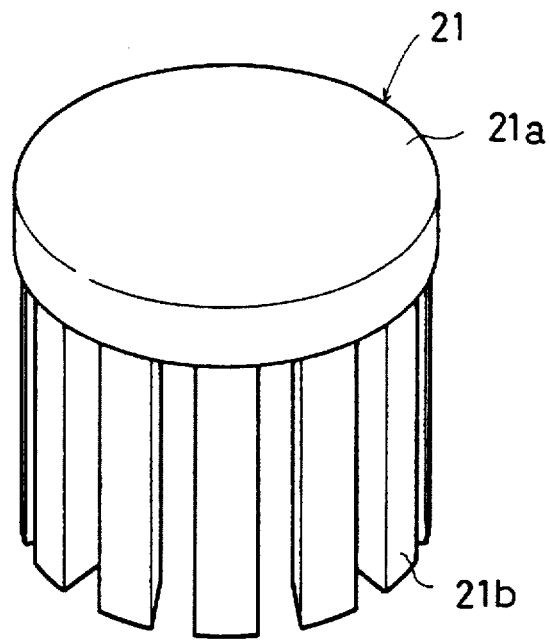
FIGS. 3A and 3B are perspective views illustrating a suction jig used in the suction-forming system according to the first embodiment.
Figure 3B:
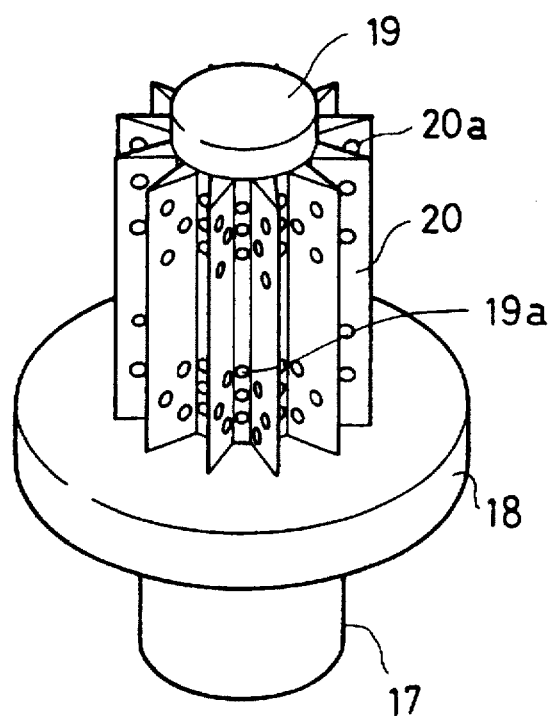
Figure 4:
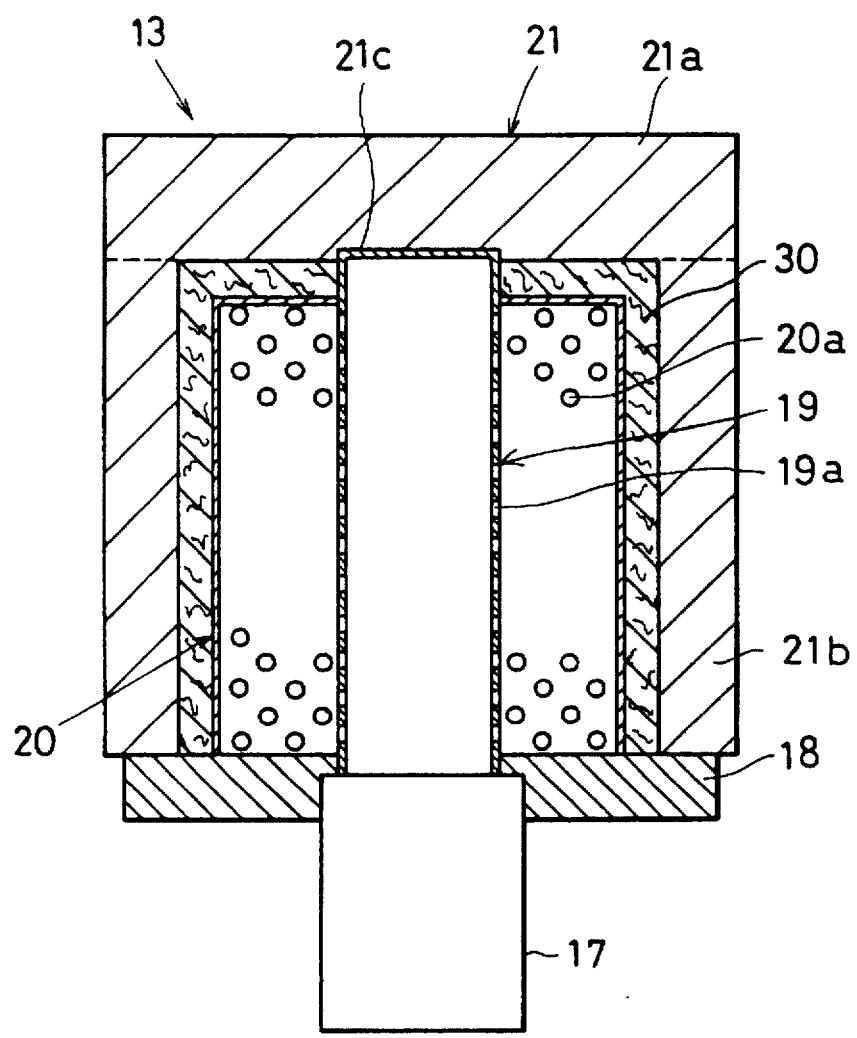
FIG. 4 is a cross-sectional view illustrating the suction jig in use.

As shown in FIGS. 3A, 3B and 4, the suction jig 13 is formed by a circular base portion 18 having a connecting pipe 17, a suction cylinder 19 which is connected with the connecting pipe 17 and is inserted into the center of the base portion 18, an inner mold 20 which is located in the outer periphery of the suction cylinder 19. The horizontal section of the inner mold 20 is formed into nearly a star-shape and engages an outer mold 21. The suction pipe 14 is connected with the opening end (lower end in FIG. 4) of the connecting pipe 17 so that the suction pipe 14 and the suction cylinder 19 are communicated each other. The upper end surface of the suction cylinder 19 is closed and a plurality of suction holes 19a are opened in the peripheral surface of the suction cylinder 19.

Further, as shown in FIG. 4, the inside portion of the inner mold 20 is a cavity, a plurality of suction holes 20a are opened in the surface of the inner mold 20. The outer mold 21 has a circular base portion 21a which is disposed at the end thereof opposite the base portion 18. A plurality of outside claw or salient portions 21b are formed on the outer periphery of the base portion 21a in circumferential direction at even intervals. As shown in FIG. 4, the top end portion of the suction cylinder 19 is inserted into a concavity 21c formed in the center portion of the inside surface of the base portion 21a, and the top end surfaces of the outside claw portions 21b are placed in contact with the surface of the base portion 18.

When the suction pump 16 is operated, the slurry in the water tank 11 passing through the spaces between the outside claw portions 21b is sucked from the suction holes 20a of the inner mold 20 and from the suction holes 19a into the inside portion of the suction cylinder 19. Then, the sucked slurry, through the suction pipe 14 from the connecting pipe 17, is sucked into the suction pump 16. The sucked slurry is, thereafter, discharged from the suction pump 16 and is returned to the water tank 11 through the discharge pipe 15.

Figure 5:
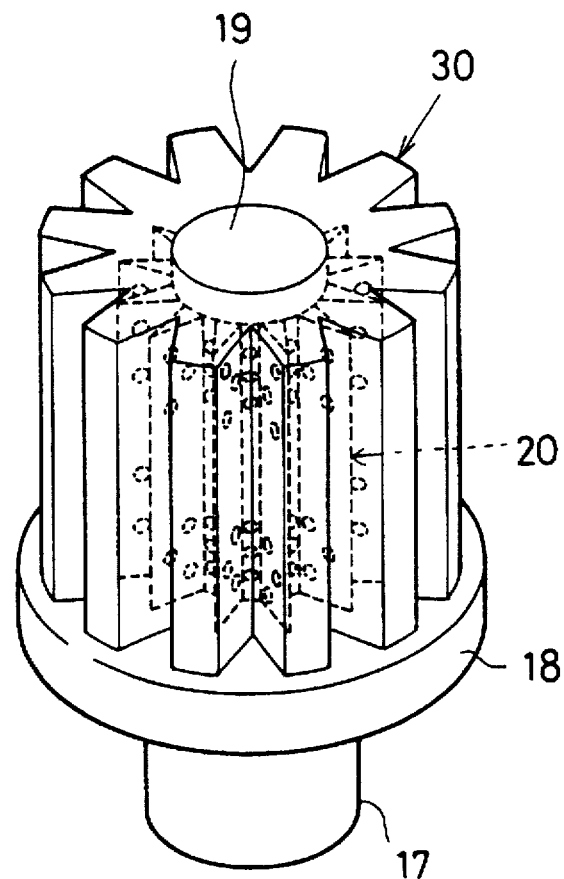
FIG. 5 is a perspective view of a filter element formed by the suction jig according to the first embodiment.
Figure 6:
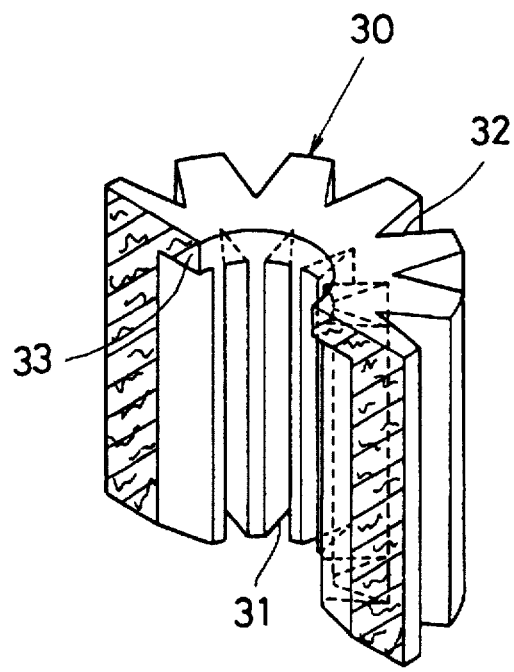
FIG. 6 is a fragmentary perspective view illustrating a main portion of the filter element according to the first embodiment.

As the slurry passes through the suction holes 20a of the inner mold 20, a part of fiber contained in the slurry is gradually attached on the surface of the inner mold 20 as the formation fiber of the molded member and is piled over the inner mold 20 to form a star-shaped molded member 30 as shown in FIG. 5. As shown in FIG. 6, a plurality of channel portions 31 and 32 corresponding to the shape of the inner mold 20 and the outer mold 21 are respectively formed in the inner peripheral surface and outer peripheral surface of the molded member 30. Further, a circular wall portion 33 is formed to close the upper ends of the channel portions 31 of the molded member.

Figure 7:
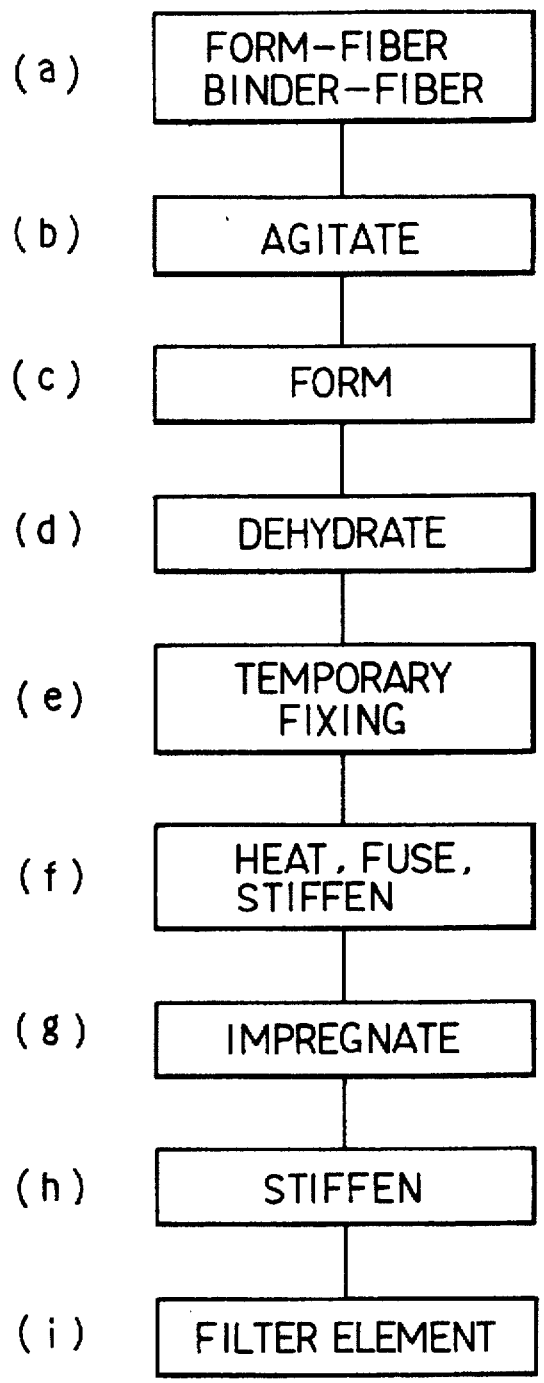
FIG. 7 is a flow chart of a manufacturing process of the filter element according to the first embodiment.
Figure 8:
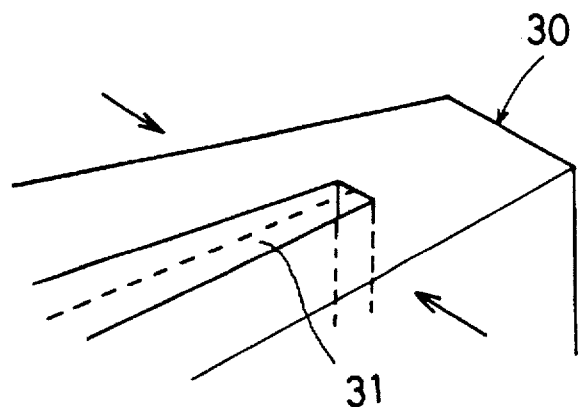
FIG. 8 is a perspective view showing a sealing process of a channel portion according to the first embodiment.
Figure 9:
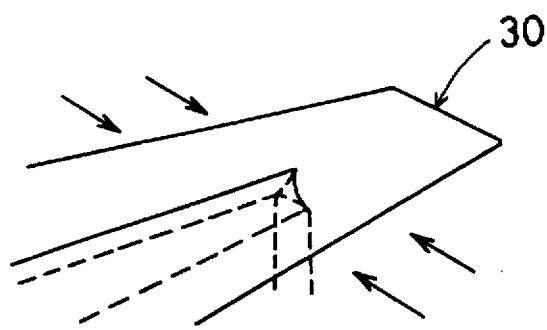
FIG. 9 is a perspective view showing the sealing process.

A method of manufacturing the filter element 3 is described with reference to a flow chart shown in FIG. 7.

First, in step (a), the formation fiber is cut short by a mixer (not shown) or the like, uniformly mixed with binder fiber (heat-fusible fiber), and put in the water tank 11. In step (b), the mixed fiber is agitated and dispersed by the agitator 12 to form an amount of slurry having an uniform concentration of fiber.

Next, in step (c), the slurry in the water tank 11 is sucked by the suction pump 16 to pass through the suction jig 13 and form the molded member 30.

Next, in step (d), the molded member 30 is detached from the suction jig 13 and is taken out from the water tank 11 into a dehydrating process.

Figure 10:
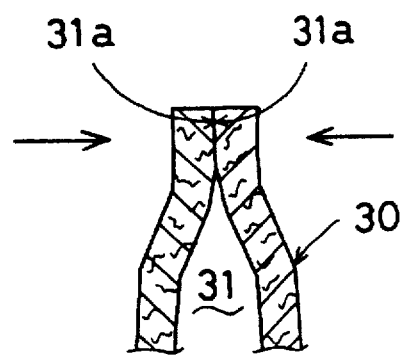
FIG. 10 is a cross-sectional view showing the seal process.

Next, in step (e), the end portion of the molded member 30 opposite the wall portion 33 is pressed from outside to crush the channel portions 31 so that the two side surfaces 31a close the channel portions 31 and fix each other temporarily as shown in FIG. 10.

Next, in step (f), the molded member 30 is heated at a specified temperature to stiffen. Thus, the binder fiber, which is added to the formation fiber, is fused and stiffened to hold the shape of the molded member 30.

Next, in step (g), binder resin (heat stiffened resin such as phenol resin) is impregnated into the molded member 30, which is heated at a specified temperature to stiffen the binder resin in step (i). Thus, the closing two side surfaces 31a of the channel portions 31 are bonded by the binder resin and the filter element 3 is finally manufactured in step (i). In the above-described manufacturing steps, the step (e) of closing and temporarily fixing the channel portions 31 may be performed after the drying step (f).

Further, if the shape of the molded member 30 can be held without the binder fiber in the step (f), the binder fiber can be omitted. If the desirable stiffness of the molded member is obtained by the binder fiber only, the steps (g) and (h) of using the binder resin can be omitted. However, in this case, because the two surfaces 31a of the channel portions 31 are stiffened by the binder fiber, the step (e) of closing and temporarily fixing the channel portions 31 is necessary before the drying step(f).

Figure 11:
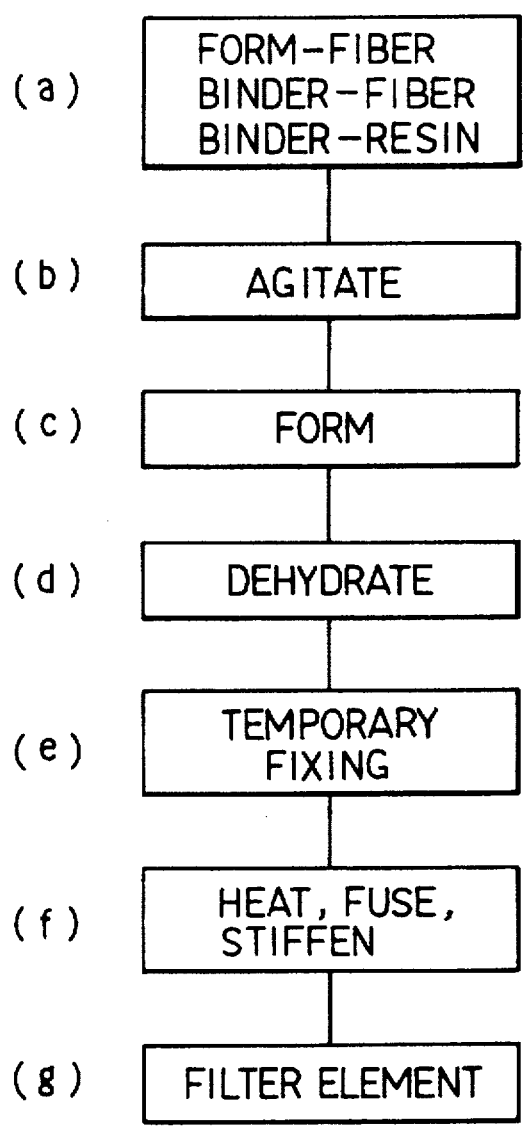
FIG. 11 is a flow chart of a manufacturing process of a filter element according to the first embodiment.

If the thermosetting binder resin is added to the formation fiber and the binder fiber in the first step (a), the steps of manufacturing the filter element 3 are shown in FIG. 11. After finishing the forming step (c) and the dehydrating step (d), the two side surfaces 31a of the channel portions 31 are made in tight contact with each other so that the channel portion 31 is temporarily fixed in step (e). Then, in step (f), the binder fiber and the thermosetting binder resin are heated so that the binder fiber is fused to stiffen and the binder resin stiffens also. Thus, the two side surfaces of the channel portions 31 which are temporarily fixed in the step (e) are bonded together by the binder resin mainly, thereby closing the channel portions 31. In this manufacturing steps, the binder fiber may be omitted.

Figure 12:
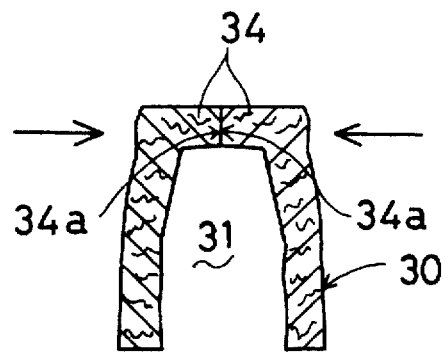
FIG. 12 is a cross-sectional view showing the sealing process of the channel portion according to the first embodiment.
Figure 13:
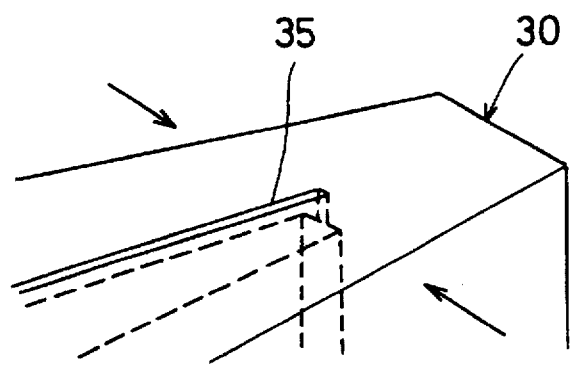
FIG. 13 is a perspective view showing the sealing process of the channel portion according to the first embodiment.
Figure 14:
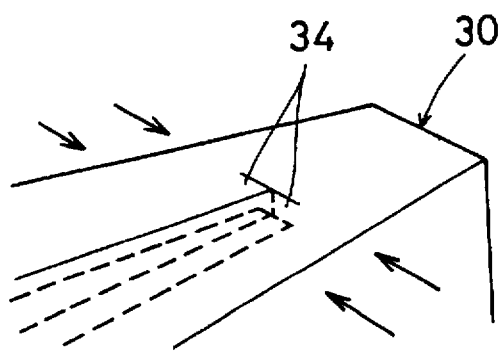
FIG. 14 is a perspective view showing the sealing process of the channel portion according to the first embodiment.

In the first embodiment, in the end portion of the molded member 30 opposite the wall portion 33, the channel portion 31 is opened in the forming step. However, as shown in FIG. 12, two claw-shaped portions 34a may be formed to close the channel portions 31. In this case, it is necessary to take off the inner mold 20 after finishing the forming step and, therefore, a small opening 35 is formed between the two claw-shaped portions 34a as shown in FIG. 13. In order to close the small opening, the two claw-shaped portions 34a are pressed from outer side as shown in FIG. 14. Then, the channel portion 31 is bonded.

Therefore, the filter element according to the first embodiment as described above does not require a specific adhesive material for sealing the end surface of the molded member 30. Further, because the two side surfaces 31a of the channel portion 31 are bonded to close the channel portions 31, an extra sealing material is not necessary, thereby decreasing the number of components. Furthermore, because the wall portion 33 for closing the channel portions 31 is formed on one end surface of the molded member 30, only the other end of the molded member 30 has to be sealed (closing the channel portion 31). As a result, man-hours required for sealing the molded member 30 can be greatly decreased as compared with the conventional process.

(Second Embodiment)

Figure 15:
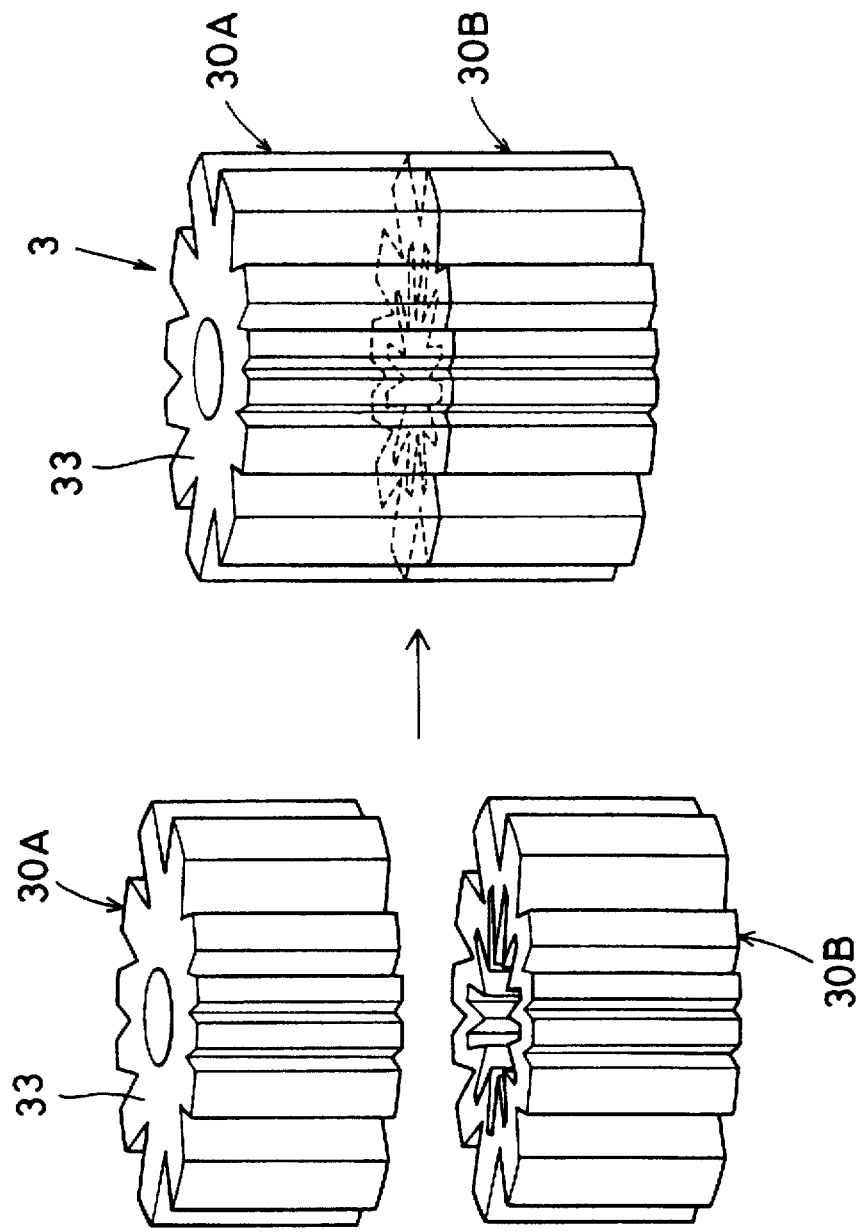
FIGS. 15A and 15B are perspective views illustrating the filter element in manufacturing according to a second embodiment.

As shown in FIGS. 15A and 15B, in the second embodiment, the filter element 3 of the second embodiment is composed of two molded bodies 30A and 30B, each of which respectively has a wall portion 33 for closing the channel portions 31 or 32 at one end, the filter element 3 is formed by binding the end surfaces of the other ends of the molded bodies 30A and 30B.

In the second embodiment, each of the forming bodies 30A and 30B is formed by the suction jig 13 shown in FIGS. 3 and 4. However, the overall length of cylindrical direction of each of the forming bodies 30A and 30B is nearly half of the molded member 30 described in the first embodiment. The longitudinally extending channel portions 31 and 32 are respectively formed in the inner peripheral surface and the outer peripheral surface of each of the forming bodies 30A and 30B. The wall portions 33 are formed in the inner peripheral surface thereof.

Figure 16:
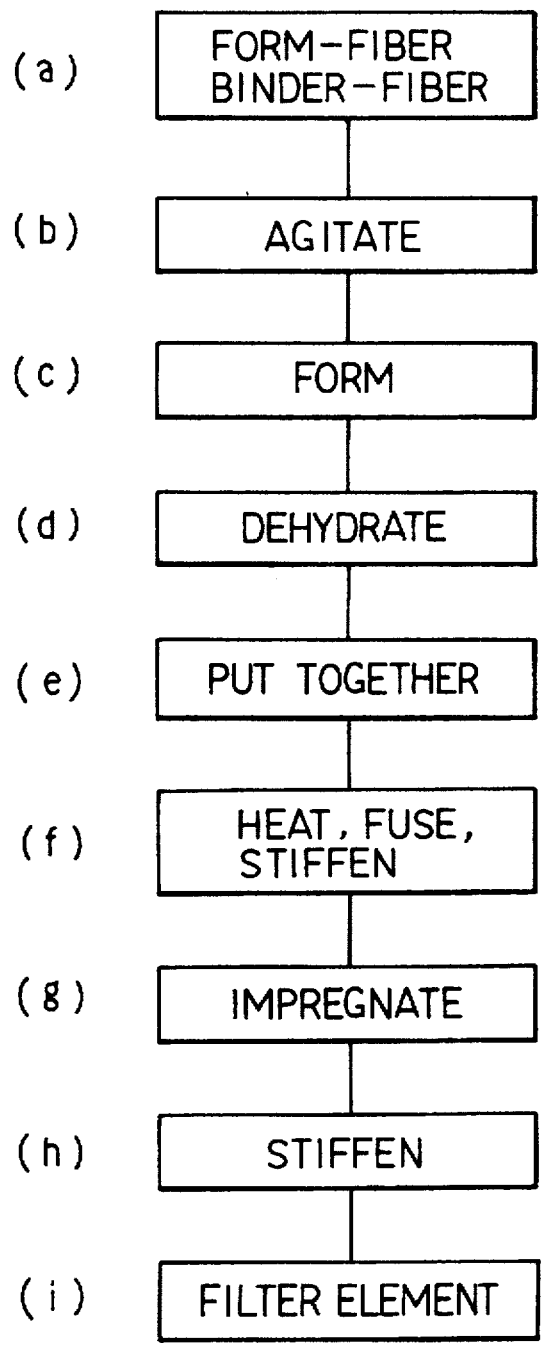
FIG. 16 is a flow chart of a manufacturing process of the filter element according to the second embodiment.

The manufacturing steps of the filter element 3 according to the second embodiment is described with reference to a flow chart shown in FIG.16.

However, the description about the same or substantially the same steps with the first embodiment is omitted.

After forming each the molded bodies 30A and 30B and performing the dehydrating process in steps (a) through (d), the end surfaces of the end opposite the wall portion of each of the forming bodies 30A and 30B are disposed to face and become in tight contact with each other as shown in FIG. 15B so that the two end surfaces thereof are temporarily fixed in step (e).

Then, through drying step (f) in a high temperature and step (g) of impregnating the binder resin as well as step (h) of stiffening the binder resin, the end surfaces of the forming bodies 30A and 30B are bonded to each other, so that the filter element 3 of the second embodiment is formed in step (i) However, the step (e) of temporarily fixing the other end surface of each of the forming bodies 30A and 30B may be replaced after the dehydrating step (f).

Figure 17:
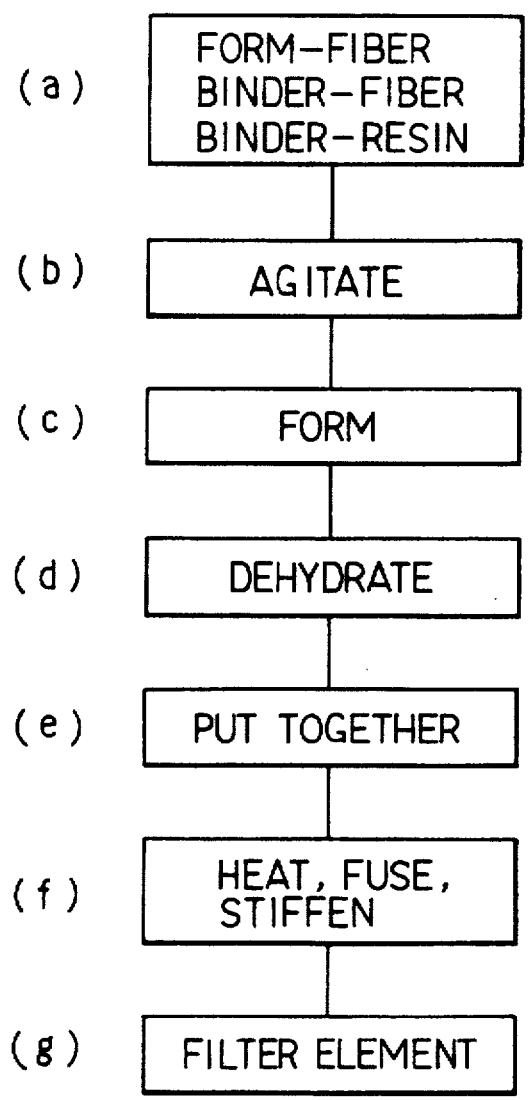
FIG. 17 is a flow chart of a manufacturing process of the filter element of the second embodiment.

FIG. 17 shows process in which the binder resin is added to the formation fiber and the binder fiber in the first step. The process is easy to understand from the previous descriptions and, therefore, is omitted.

In the second embodiment, a specific adhesive material for sealing the surface of the molded member 30 is not needed as in the first embodiment. Therefore, the manufacturing process becomes simple and productivity can be improved.

(Third Embodiment)

Figure 18:
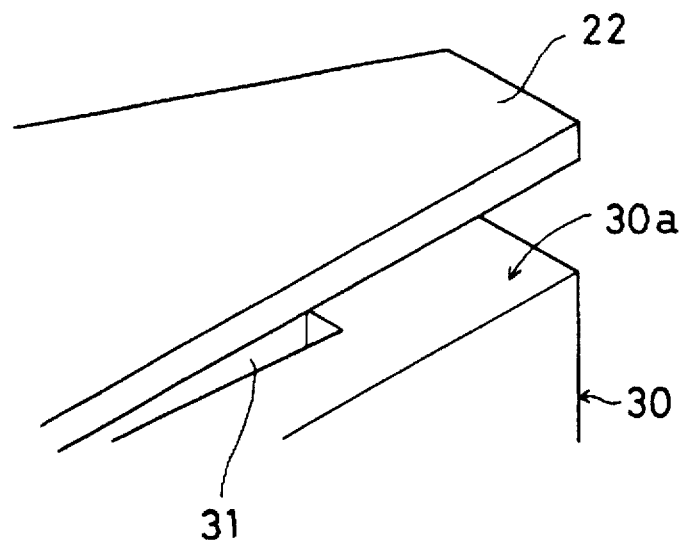
FIG. 18 is a perspective view showing the sealing process of the channel portion according to a third embodiment.

A filter element according to a third embodiment is described with reference to FIGS. 18 to 20. A sealing member 22 is put on an end surface 30a of the molded member 30 which is formed by the suction jig 13 shown in FIGS. 3 and 4. The wall portion 33 similar to that of the first embodiment closes the channel portions 31 formed in inner peripheral surface of the molded member 30.

Figure 19:
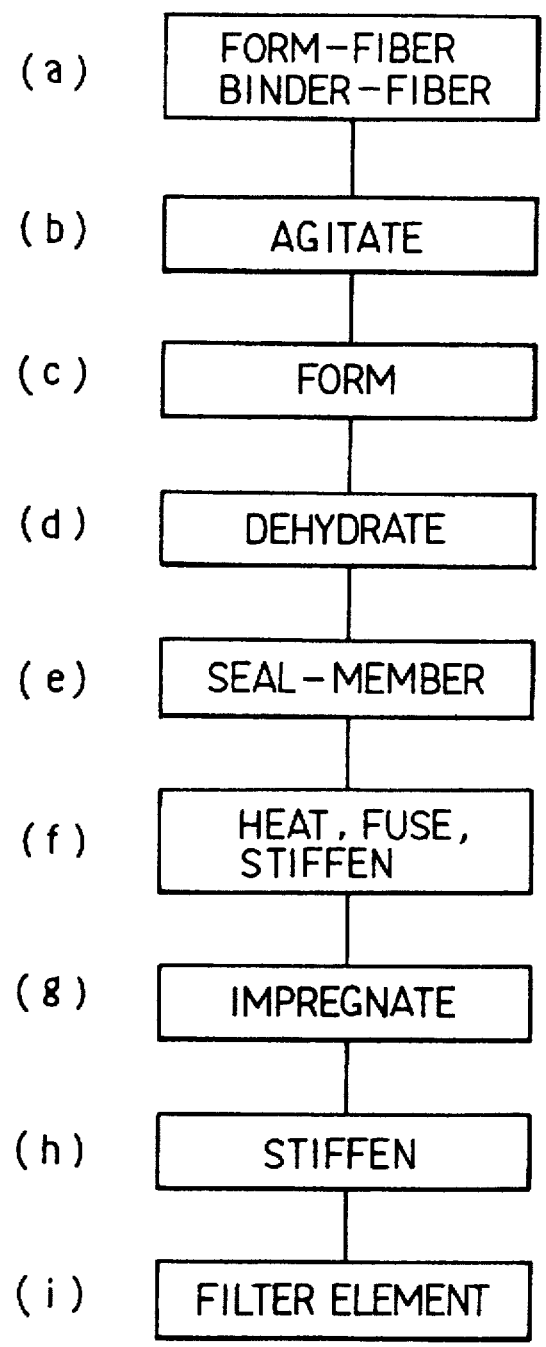
FIG. 19 is a flow chart of a manufacturing process of the filter element according to the third embodiment.

The filter element 3 according to the third embodiment is manufactured in accordance with the processing procedure shown by a flow chart in FIG. 19.

After dehydrating the formed molded member 30 in the steps (a) through (c) which are substantially the same as the previous embodiments, a sealing member 22 is put on a surface opposite the wall portion 33 to be temporarily fixed thereto in step (e).

Then, through the high-temperature drying step (f) and the binder-resin impregnating step (g), the binder-resin stiffening step (h), and the sealing member bonding step, the filter element 3 of the third embodiment is completed in step (i). However, the sealing-member-temporary-fixing step (e) may be shifted until after the dehydrating step (f).

Figure 20:
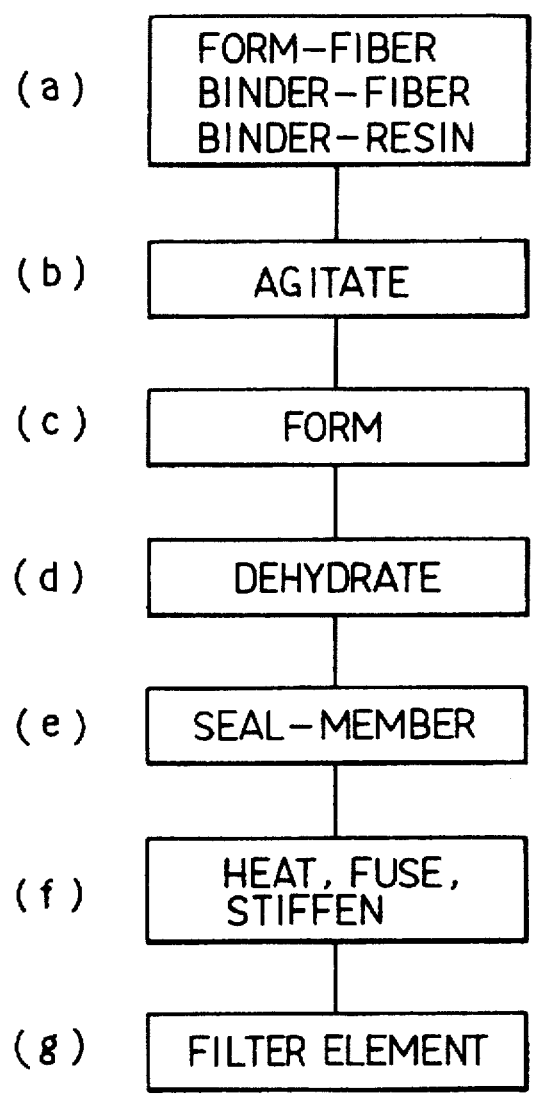
FIG. 20 is a flow chart of a manufacturing process of the filter element of the third embodiment.

Further, when the binder resin is added to the formation fiber and the binder fiber in the first step, the process is changed as shown in FIG. 20 (the explanation is omitted).

In the third embodiment, the sealing member 22 can be bonded to the other end surface 30a of the molded member 30 by the binder resin or the binder fiber used in the manufacturing step of the filter element 3. Therefore, an adhesive material for only binding the seal material 22 is not used, so that it is not necessary that the surface of the sealing member 22 or the other end surface 30a of the molded member 30 is applied to the adhesive material. Thus, the manufacturing process becomes simple and productivity can be improved.

In the second embodiment and the third embodiment, the binder fiber can be omitted when the shape of the molded member 30 can be held by only the formation fiber as in the first embodiment. Further, when the binder fiber is added to the formation fiber, the binder resin may be omitted when the desired stiffness of the molded member 30 can be obtained by the binder fiber only. However, in this case, because the seal surface is bonded by the stiffened binder fiber, the step (e) described in the second embodiment and the third embodiment must come before the dehydrating step (f).

(Variational Examples)

In the above-described embodiments, the filter element 3 has the wall portion 33 at one end of the cylindrical direction thereof. However, the molded member 30 without the wall portion 33 in any one end side is formed by the water tank (that is, both ends of the channel portions 31 open to the outside). Then, both ends of the molded member 30 is pressed from outside to close the channel portions 31 as described in the first embodiment.

Also, one end of the molded member 30 is pressed from outside to close the channel portions as in the first embodiment and the sealing member 22 is added to close the other end of the molded member thereby closing the channel portions as described in the third embodiment.

Further, the two ends of the molded member 30 are respectively closed by the sealing members 22 so that the channel portions 31 may be closed.

However, in the above-described variational examples, each of the seal portions is bonded by the binder resin or the binder fiber used in the manufacturing steps.

Figure 21:
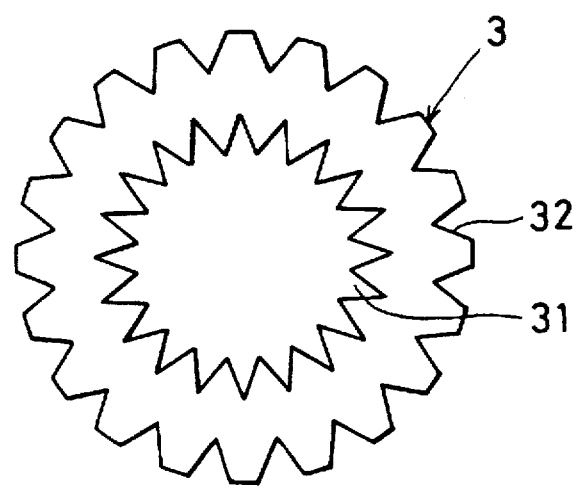
FIG. 21 is a plan view illustrating a filter element of a variation.
Figure 22:
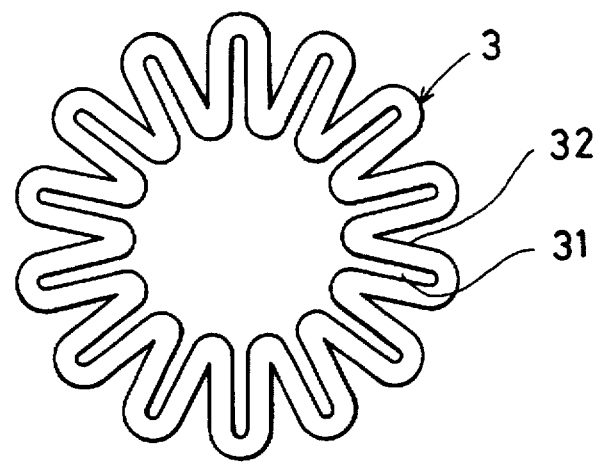
FIG. 22 is a plan view illustrating a filter element of another variation.
Figure 23:
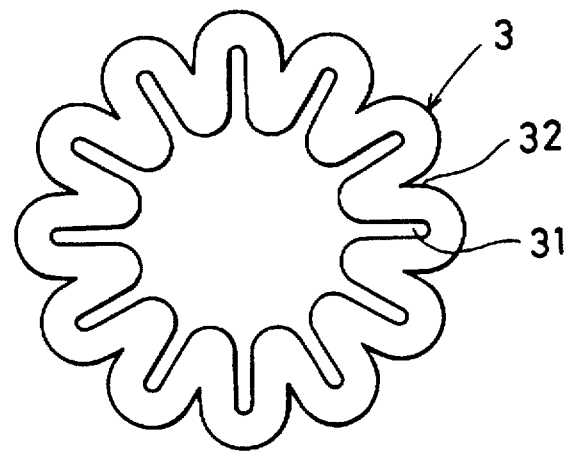
FIG. 23 is a plan view showing a filter element of still another variation.

Further, other shapes of the filter element 3 are shown in FIGS. 21 through 23. As shown in FIG. 23, when the stiffness of the filter element is not enough because of the thin molded member, a reinforcing member such as a member made of metal meshes may be added thereto.

Further, in the above-described embodiments, the channel portions 31 and 32 are respectively formed in the inner and outer peripheral surfaces of the filter element 3. However, the channel portion 31 may be only formed on the inner peripheral surface.

Further, the filter element 3 of the oil filter 1 can be used for filtering other kinds of liquid, gas or the like.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A method of manufacturing a filter element having a desired shape and a plurality of longitudinally extending channels therein, said method comprising steps of:

providing slurry of suspended formation fiber in a water tank;

sucking said slurry of suspended formation fiber from said water tank to form a molded member having said desired shape and said channels;

closing said channels at one end of said molded member; and adding binder to said molded member for stiffening;
said adding binder step including adding a thermosetting resin in said slurry and heating said thermosetting resin.

2. A method of manufacturing a filter element having a desired shape and a plurality of longitudinally extending channels therein, said method comprising steps of:

providing slurry of suspended formation fiber in a water tank;

sucking said slurry of suspended formation fiber from said water tank to form a molded member having said desired shape and said channels;

closing said channels at one end of said molded member; and adding binder to said molded member for stiffening;
wherein said binder comprises thermosetting resin,
said adding step includes impregnating said thermosetting resin into closing portions of said channels of said molded member, pressing said channel portions from outside to close said portions and heating said closing portions.

3. A method of manufacturing a filter element having a desired shape and a plurality of longitudinally extending channels therein, said method comprising steps of:

providing slurry of suspended formation fiber in a water tank;

sucking said slurry of suspended formation fiber from said water tank to form a molded member having said desired shape and said channels;

closing said channels at one end of said molded member; and adding binder to said molded member for stiffening;
wherein said closing step includes covering one end of said molded member with a sealing member; and
wherein said adding binder step includes adding a thermosetting resin in said slurry and heating said thermosetting resin.

4. A method of manufacturing a filter element having a desired shape and a plurality of longitudinally extending channels therein, said method comprising steps of:

providing slurry of suspended formation fiber in a water tank;

sucking said slurry of suspended formation fiber from said water tank to form a molded member having said desired shape and said channels;

closing said channels at one end of said molded member; and adding binder to said molded member for stiffening;
wherein said closing step includes covering one end of said molded member with a sealing member; and
wherein said binder comprises thermosetting resin, and
wherein said adding step includes impregnating said thermosetting resin into closing portions of said channels of said molded member and heating said closing portions.

5. A method of manufacturing a filter element having a desired shape and a plurality of longitudinally extending channels therein, said method comprising steps of:

providing slurry of suspended formation fiber in a water tank;

sucking said slurry of suspended formation fiber from said water tank to form a molded member having said desired shape and said channels closing at one end of said molded member;

adding binder to said molded member for stiffening; and pressing an end of said molded member opposite said closing channels from outside before said step of adding binder.

6. A method of manufacturing a filter element having a desired shape and a plurality of longitudinally extending channels therein, said method comprising steps of:

providing slurry of suspended formation fiber in a water tank;

sucking said slurry of suspended formation fiber from said water tank to form a molded member having said desired shape and said channels closing at one end of said molded member;

adding binder to said molded member for stiffening; and covering one end of said molded member opposite said closing channels with a sealing member before said step of adding binder.

7. A method of manufacturing a filter element having a desired shape and a plurality of longitudinally extending channels therein, said method comprising:

providing slurry of suspended formation fiber in a water tank;

sucking said slurry of suspended formation fiber from said water tank to form a pair of molded members each of which has said desired shape and said channels closing at one end of each of said molded members; and adding binder to said molded members for stiffening;
wherein said binder includes thermosetting resin contained in said slurry and heating said thermosetting resin.

8. A method of manufacturing a filter element having a desired shape and a plurality of longitudinally extending channels therein, said method comprising:

providing slurry of suspended formation fiber in a water tank;

sucking said slurry of suspended formation fiber from said water tank to form a pair of molded members each of which has said desired shape and said channels closing at one end of each of said molded members; and adding binder to said molded members for stiffening;
wherein said binder comprises thermosetting resin, and said adding step comprises steps of:
impregnating said thermosetting resin into closing portions of said channels of said molded member;
putting end surfaces of said pair of molded members opposite said closing portions together; and
bonding said end surfaces by said binder.

9. A method of manufacturing a filter element, said method comprising:

molding a fibrous filter member having longitudinal channels using a thermosetting resin as a binder by sucking a slurry of suspended formation fibers from a water tank; and heating said molded member to set said thermosetting resin.

10. A molded fibrous filter member having longitudinal channels and a thermoset thermosetting resin binder manufactured in accordance with the method of claim 9.

* * * * *